United States Patent
Riel et al.

(10) Patent No.: US 10,002,016 B2
(45) Date of Patent: Jun. 19, 2018

(54) CONFIGURATION OF VIRTUAL MACHINES IN VIEW OF RESPONSE TIME CONSTRAINTS

(71) Applicant: Red Hat, Inc., Raleigh, NC (US)

(72) Inventors: Henri Van Riel, Merrimack, NH (US); Luiz Capitulino, Gatineau (CA); Marcelo Tosatti, Porto Alegre (BR)

(73) Assignee: Red Hat, Inc., Raleigh, NC (US)

( * ) Notice: Subject to any disclaimer, the term of this patent is extended or adjusted under 35 U.S.C. 154(b) by 107 days.

(21) Appl. No.: 14/807,727

(22) Filed: Jul. 23, 2015

(65) Prior Publication Data

US 2017/0024231 A1    Jan. 26, 2017

(51) Int. Cl.
*G06F 9/455* (2018.01)
*G06F 9/50* (2006.01)

(52) U.S. Cl.
CPC ........ *G06F 9/45558* (2013.01); *G06F 9/5005* (2013.01); *G06F 2009/45562* (2013.01)

(58) Field of Classification Search
CPC .. G06F 9/45558; G06F 9/5038; G06F 9/5077; G06F 2009/45562
USPC .......................................................... 718/1
See application file for complete search history.

(56) References Cited

U.S. PATENT DOCUMENTS

| | | | |
|---|---|---|---|
| 5,903,752 A | 5/1999 | Dingwall et al. | |
| 7,356,817 B1 | 4/2008 | Cota-Robles et al. | |
| 8,146,107 B2 | 3/2012 | Canton | |
| 8,166,485 B2 | 4/2012 | Krishnakumar et al. | |
| 8,719,834 B2 * | 5/2014 | Amano | G06F 9/5077 718/103 |
| 8,738,972 B1 | 5/2014 | Bakman et al. | |
| 9,262,198 B2 * | 2/2016 | Zheng | H04L 47/56 |
| 9,274,852 B2 * | 3/2016 | Song | G06F 9/5077 |
| 9,304,805 B2 * | 4/2016 | Cropper | G06F 9/45558 |
| 9,372,705 B2 * | 6/2016 | Cropper | G06F 9/5044 |
| 2006/0218550 A1 | 9/2006 | Tao | |

(Continued)

FOREIGN PATENT DOCUMENTS

CN            103678003 A         3/2014

OTHER PUBLICATIONS

VMWare "Deploying Extremely Latency-Sensitive Applications in VMware vSphere 5.5"; VMWare Technical Whitepaper (vmware.com); Aug. 27, 2013.*

(Continued)

*Primary Examiner* — Benjamin C Wu
*Assistant Examiner* — Willy W Huaracha
(74) *Attorney, Agent, or Firm* — Lowenstein Sandler LLP

(57) ABSTRACT

A system and methods are disclosed for configuring a virtualized system for real-time response from virtual machines (VMs). In accordance with one embodiment, a VM request is received, where the request specifies a number N of virtual processors for executing real-time tasks, and where N is a positive integer. In response to the VM request, a plurality of physical processors are partitioned into a first subset dedicated to real-time tasks and a second subset dedicated to non-real-time tasks, the first subset having at least N physical processors, and one or more commands are submitted to one or both of a hypervisor and a guest OS of a first VM to configure the first VM to have N virtual processors dedicated to real-time tasks and a set of additional virtual processors dedicated to non-real-time tasks.

19 Claims, 5 Drawing Sheets

(56) References Cited

U.S. PATENT DOCUMENTS

| | | | |
|---|---|---|---|
| 2009/0083516 A1* | 3/2009 | Saleem | G06F 9/505 |
| | | | 712/28 |
| 2011/0145505 A1* | 6/2011 | Anand | G06F 12/0895 |
| | | | 711/130 |
| 2013/0198758 A1* | 8/2013 | Lim | G06F 9/5038 |
| | | | 718/104 |
| 2014/0082240 A1 | 3/2014 | Coleman et al. | |
| 2015/0052614 A1 | 2/2015 | Crowell et al. | |

OTHER PUBLICATIONS

Ye, Ying, et al. "MARACAS: A Real-Time Multicore VCPU Scheduling Framework." Real-Time Systems Symposium (RTSS), 2016 IEEE. IEEE, 2016. pp. 1-12.*

Zhou, L. et al. "Virtual Machine Scheduling for Parallel Soft Real-Time Applications," Proceedings of the 2013 IEEE 21st International Symposium on Modelling, Analysis & Simulation of Computer and Telecommunication Systems, Aug. 14, 2013, 10 pages.

Masrur, A. et al. "VM-Based Real-Time Services for Automotive Control Applications," Proceedings of 2010 IEEE 16th International Converence on Embedded and real-Time Computing Systems and Applications, Aug. 23-25, 2010, 6 pages.

Xi, S. et al. "Real-Time Multi-Core Virtual Machine Scheduling in Xen," Proceedings of 2014 International Converence on Embedded Software (EMSOFT), Oct. 12-17, 2014, 11 pages.

\* cited by examiner

CONFIGURATION OF VIRTUAL MACHINES IN VIEW OF RESPONSE TIME CONSTRAINTS

TECHNICAL FIELD

This disclosure relates to computer systems, and more particularly, to virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system of the host machine is typically referred to as the "host operating system."

A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, backing up the state of virtual machines periodically in order to provide disaster recovery and restoration of virtual machines, etc.

A virtual machine may comprise one or more "virtual processors," each of which maps, possibly in a many-to-one fashion, to a central processing unit (CPU) of the host machine. Similarly, a virtual machine may comprise one or more "virtual devices," each of which maps, typically in a one-to-one fashion, to a device of the host machine (e.g., a network interface device, a CD-ROM drive, etc.). The hypervisor manages these mappings in a transparent fashion, thereby enabling the guest operating system and applications executing on the virtual machine to interact with the virtual processors and virtual devices as though they were actual physical entities.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
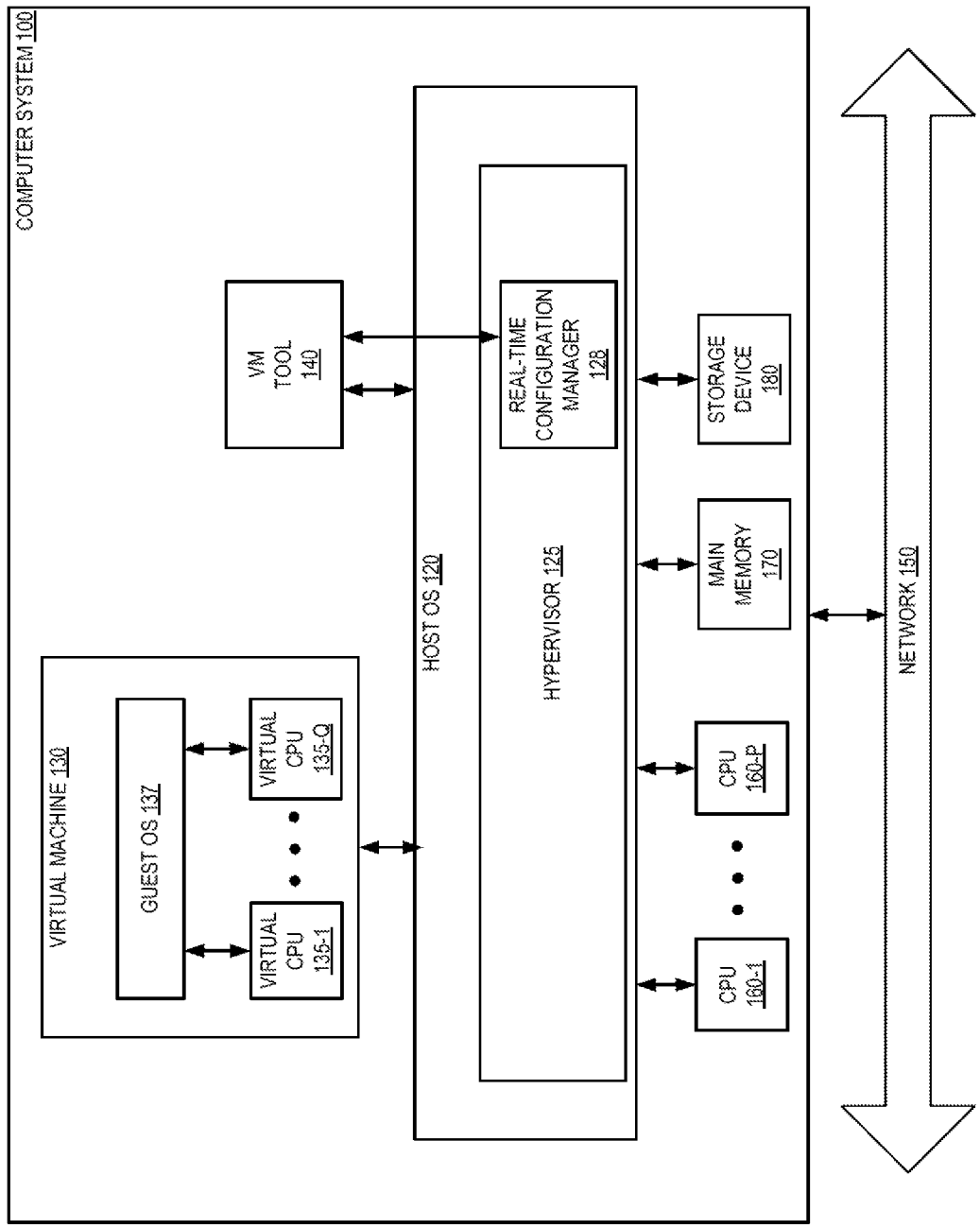
FIG. 1 depicts an illustrative computer system architecture, in accordance with an embodiment of the present disclosure.

Described herein is a system and methods enabling real-time response in virtualized systems. The term "real-time" indicates that a response will occur within a specified time constraint, often referred to as a deadline. For example, a real-time network application might have a requirement that 99.99% of incoming messages have a reply sent out in under 50 microseconds.

In contrast, "non-real-time" indicates that a response cannot be guaranteed within any time frame, although an expected response time may be specified. For example, the average response time of a non-real-time entity (e.g., a non-real-time task, a non-real-time application, a non-real-time operating system, a non-real-time system, etc.) might be under 50 microseconds, but there could be occasional outliers where it takes milliseconds for a response.

Whether a particular task is real-time-capable (i.e., capable of providing a real-time response) depends on the resources dedicated to that task. In particular, it depends on: the number of resources dedicated to the task (the fewer system resources are dedicated to non-real-time tasks, the more are left over for tasks that require real-time response); the way in which resources are assigned to that task (for example, a real-time task does not share a CPU with other tasks, while a non-real-time task might; similarly, management of a resource is not time-shared for a real-time task, but might be time-shared for a non-real-time task); and whether the resources themselves have guaranteed response times (for example, the response time of a network might adhere to a specified time constraint [e.g., 20 microseconds, 50 microseconds, 100 microseconds, etc.], while a disk is extremely slow and cannot adhere to such a time constraint).

In classical (i.e., non-virtualized) real-time systems, applications are assigned real-time priorities, and an application that becomes runnable can preempt (e.g., via an interrupt, etc.) any program on the same CPU having a lower real-time priority, or having no real-time priority. In virtualized environments, this approach does not work reliably for several reasons. First, the real-time priorities of programs inside a virtual machine are not visible to the host operating system (OS). Second, because the switching in and out of virtual machines causes delays, physical processors cannot be shared among multiple virtual processors or tasks, and real-time response cannot be guaranteed.

Third, a task that is non-real-time or has a low real-time priority may perform functions that are not directly supported by system hardware. Such functions typically require software emulation, which can take a significant amount of time. Because the virtual processor assigned to such a task is not running during software emulation, the task cannot be preempted to run a higher-priority task, which again compromises real-time response.

Accordingly, real-time tasks in virtualized systems need to be isolated twice: once on the physical machine, so that virtual processors running real-time tasks are assigned to dedicated physical processors; and once inside the virtual machine, so that real-time tasks are not assigned to virtual processors running programs that could cause a trap to emulation code in the host or hypervisor. Configuring virtualized systems in this manner can be complicated. For example, a system with 32 CPUs might be partitioned such that 28 CPUs are reserved for real-time tasks, and four CPUs are reserved for non-real-time system tasks. A virtual machine might then be configured to have eight virtual processors, six reserved for real-time tasks, and two reserved for non-real-time system tasks, where each of the six real-time virtual processors runs on a respective one of the 28 real-time physical processors.

Embodiments of the present disclosure enable such configuration to be performed in an automated fashion. In accordance with one embodiment, the physical processors of a virtualized computer system are partitioned into two categories, the first dedicated to real-time tasks, and the second dedicated to non-real-time tasks (e.g., system tasks such as network routing, disk accesses, etc.). A request for a virtual machine is received, where the request specifies a number N of virtual processors in the VM for executing real-time tasks, and where N is a positive integer that is no greater than the number of physical processors in the first category. In response to the request, one or more commands are submitted to configure a requested VM to have N virtual processor for executing real-time tasks. In one example, the commands may be submitted to a guest operating system of the requested VM, while in another example the commands may be submitted to a hypervisor, while in yet another example commands may be submitted to both the guest OS and the hypervisor.

In one embodiment, the requested virtual machine is configured to have K virtual processors that are dedicated to real-time tasks, with each of the K virtual processors assigned to a respective physical processor of the first category. Optionally, the requested virtual machine may also be configured to have S additional virtual processors that are dedicated to non-real-time tasks, where S is a positive integer.

In one embodiment, the additional non-real-time virtual processors may be assigned to one or more physical processors of the second category, or to available physical processors of the first category (i.e., first-category physical processors that do not have any of the K real-time virtual processors assigned to them), or some combination thereof. For example, if a virtual machine has two additional non-real-time virtual processors V1 and V2, then V1 and V2 could be assigned to physical processors in any of the following configurations:

V1 and V2 assigned to different non-real-time (i.e., second-category) physical processors;

V1 and V2 assigned to the same non-real-time physical processor;

V1 assigned to an available real-time (i.e., first-category) physical processor and V2 assigned to a non-real-time physical processor;

V1 and V2 assigned to different available real-time physical processors;

or

V1 and V2 assigned to the same available real-time physical processor.

In one embodiment, the partitioning of the physical processors occurs in response to the request for a VM, while in another embodiment, the partitioning occurs prior to receiving the request, while in yet another embodiment, a partition exists prior to receiving the request, and this partition is changed in response to the request. In one example, the partitioning of the physical processors is performed by a host operating system.

In one embodiment, a software tool submits the one or more commands to configure the VM. In some implementations the software tool also performs the assigning of virtual processors to physical processors, while in some other implementations the assigning is performed by one or more other entities (e.g., a hypervisor, a guest OS of the VM, etc.).

Embodiments of the present disclosure thus enable the creation of real-time virtualized systems. Moreover, embodiments provide the capability to perform, with minimal manual effort, the complicated tasks involved in configuring such systems.

In one implementation, physical CPUs are partitioned into real-time and non-real-time CPUs after a request for a VM has been received, as is described in detail below with respect to method 200 of FIG. 2. In another implementation, physical CPUs are partitioned into real-time and non-real-time CPUs prior to receiving a request for a VM, as is described in detail below with respect to method 300 of FIG. 3. In yet another implementation, as is described in detail below with respect to method 400 of FIG. 4, an existing partition of physical CPUs is modified in response to receiving a request for a VM that specifies a greater number of real-time virtual CPUs than can be accommodated by the existing partition.

FIG. 1 depicts an illustrative architecture of elements of a computer system 100, in accordance with an embodiment of the present disclosure. It should be noted that other architectures for computer system 100 are possible, and that the implementation of a computer system utilizing embodiments of the disclosure are not necessarily limited to the specific architecture depicted by FIG. 1.

As shown in FIG. 1, the computer system 100 is connected to a network 150 and comprises central processing units (CPUs) 160-1 through 160-P, main memory 170, which may include volatile memory devices (e.g., random access memory (RAM)), non-volatile memory devices (e.g., flash memory), and/or other types of memory devices, and storage device 180 (e.g., a magnetic hard disk, a Universal Serial Bus [USB] solid state drive, a Redundant Array of Independent Disks [RAID] system, a network attached storage [NAS] array, etc.). The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

Computer system 100 runs a host operating system (OS) 120 that manages the hardware resources of the computer system and that provides functions such as interprocess communication, scheduling, virtual memory management, and so forth. In one embodiment, host OS 120 is a real-time-capable operating system.

In some examples, host operating system 120 also comprises a hypervisor 125, which provides a virtual operating platform for virtual machine 130 and that manages its execution. In one embodiment, hypervisor 125 is real-time-capable. It should be noted that although, for simplicity, a single virtual machine is depicted in FIG. 1, in some other embodiments computer system 100 may host a plurality of virtual machines.

Virtual machine 130 is a software implementation of a machine that executes programs as though it were an actual physical machine. In accordance with one embodiment, VM 130 comprises virtual CPUs 135-1 through 135-Q and a guest operating system (OS) 137 that manages resources and provides functions such as interprocess communication, scheduling, memory management, and so forth. In one embodiment, guest OS 137 is a real-time-capable operating system.

VM tool 140 is an application that enables a user (e.g., a system administrator, an application developer, etc.) to request a virtual machine having a particular number of real-time virtual processors (e.g., via a graphical user interface [GUI], etc.). It should be noted that in some embodiments, VM tool 140 may be hosted by a different physical machine than computer system 100 (e.g., another computer not depicted in FIG. 1).

In accordance with one example, hypervisor 125 may include a real-time configuration manager 128 that is capable of receiving requests from VM tool 140, of submitting commands to guest OS 137 and/or hypervisor 125 to configure virtual CPUs 135-1 through 135-Q, and of assigning virtual CPUs to physical CPUs, as is described in detail below with respect to FIGS. 2 through 4. It should be noted that in some other examples, hypervisor 125 may be external to host OS 120, rather than embedded within host OS 120.

Figure 2:
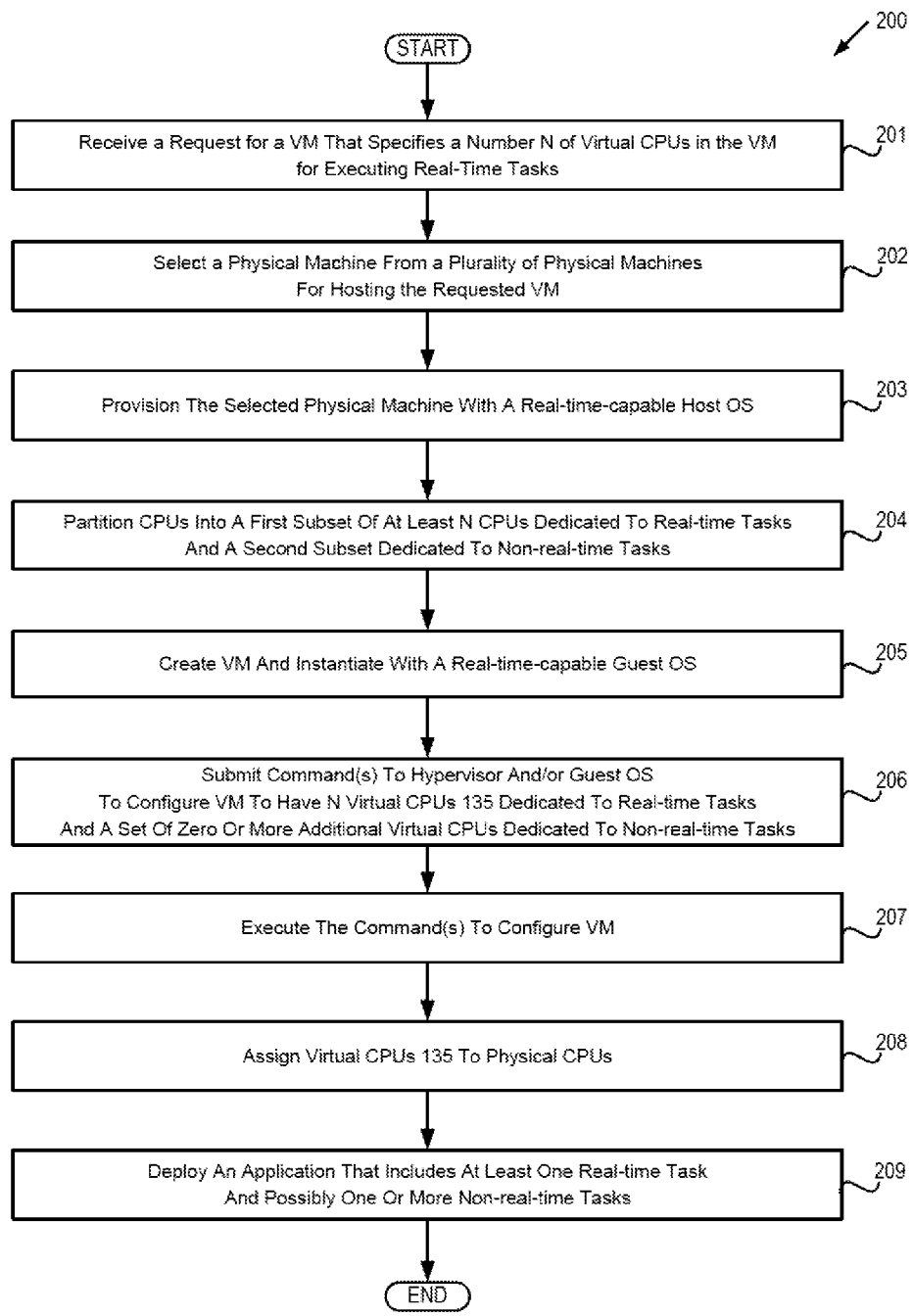
FIG. 2 depicts a flow diagram of one embodiment of a first method for configuring a virtualized system for real-time response from a virtual machine.

FIG. 2 depicts a flow diagram of one embodiment of a first method 200 for configuring a virtualized system for real-time response from a virtual machine. In this method, physical CPUs are partitioned into real-time and non-real-time CPUs after a request for a VM has been received.

The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1, while in some other embodiments, some or all of the method might be performed by another machine. It should be noted that in some embodiments blocks depicted in FIG. 2 may be performed simultaneously or in a different order than that depicted.

At block 201, a request for a virtual machine is received, where the request specifies a number N of virtual processors that the virtual machine should have for executing real-time tasks, and where N is a positive integer. In one embodiment, the request is received by VM tool 140 from a user (e.g., a system administrator, a VM administrator, an application developer, etc.). As noted above, in some examples VM tool 140 might be hosted by a machine other than computer system 100.

At block 202, a physical machine for hosting the requested VM is selected from a plurality of physical machines (e.g., a cluster, a cloud-based server farm, etc.). In one example, block 202 is performed by VM tool 140, and computer system 100 is selected as the physical machine.

At block 203, the selected physical machine is provisioned with a real-time-capable host operating system. In one example, block 203 is performed by VM tool 140, and computer system 100 is provisioned with real-time-capable host OS 120.

At block 204, CPUs 160-1 through 160-P are partitioned into a first subset dedicated to real-time tasks, and a second subset dedicated to non-real-time tasks, such that the first subset has at least N CPUs, where N is a positive integer less than P. In some embodiments block 204 is performed by hypervisor 125, while in some other embodiments block 204 is performed by host OS 120.

At block 205, VM 130 is created and instantiated with a real-time-capable guest OS 137. In one embodiment, block 205 is performed by hypervisor 125.

At block 206, one or more commands are submitted to one or both of hypervisor 125 and guest OS 137 to configure VM 130 so that is has N virtual CPUs 135 dedicated to real-time tasks and a set of zero or more additional virtual CPUs 135 dedicated to non-real-time tasks. In one embodiment, the one or more commands are submitted by VM tool 140.

At block 207, the command(s) to configure VM 130 are executed. In one implementation, one or both of hypervisor 125 and guest OS 137 are modified to execute the command(s).

At block 208, the virtual CPUs 135 are assigned to CPUs 160, such that each real-time virtual CPU is assigned to a respective real-time CPU 160, and each non-real-time virtual CPU is assigned to either a non-real-time CPU 160, or to a real-time CPU 160 if one is available (i.e., if there is a real-time CPU that does not have any real-time virtual CPU assigned to it). In some embodiments, block 208 may be performed by one or both of host OS 120 and hypervisor 125, while in some other embodiments block 208 may be performed by VM tool 140. It should be noted that in some implementations, virtual processors of other VMs should also not be assigned to real-time physical CPUs to which real-time virtual processors have already been assigned.

At block 209, an application that includes at least one real-time task, and possibly one or more non-real-time tasks, is deployed in VM 130. In some examples, the non-real-time tasks may include one or more non-real-time system tasks (e.g., a disk access, a non-real-time network routing function, etc.). It should be noted that in some examples, the real-time tasks may also include a system task that is real-time in nature (e.g., a real-time network routing function, a real-time system task that services VM 130, etc.) and that may be executed by host OS 120 or hypervisor 125. In some embodiments, the deploying may include binding each real-time task to a respective real-time virtual CPU 135.

Figure 3:
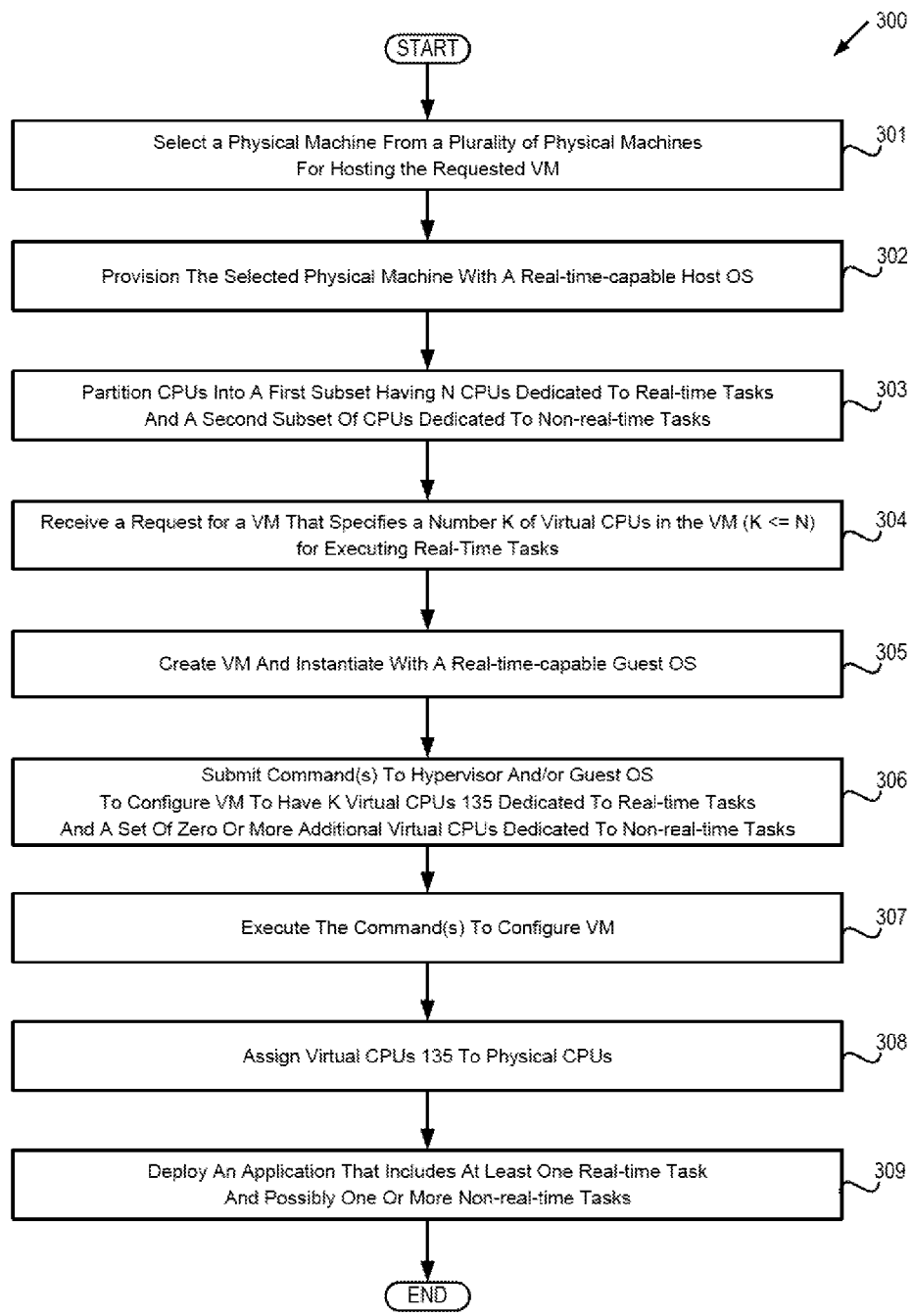
FIG. 3 depicts a flow diagram of one embodiment of a second method for configuring a virtualized system for real-time response from a virtual machine.

FIG. 3 depicts a flow diagram of one embodiment of a second method 300 for configuring a virtualized system for real-time response from a virtual machine. In this method, physical CPUs are partitioned into real-time and non-real-time CPUs prior to receiving a request for a VM.

The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1, while in some other embodiments, some or all of the method might be performed by another machine. It should be noted that in some embodiments blocks depicted in FIG. 3 may be performed simultaneously or in a different order than that depicted.

At block 301, a physical machine for hosting one or more VMs is selected from a plurality of physical machines (e.g., a cluster, a cloud-based server farm, etc.). In one example, block 301 is performed by VM tool 140, and computer system 100 is selected as the physical machine.

At block 302, the selected physical machine is provisioned with a real-time-capable host operating system. In one example, block 302 is performed by VM tool 140, and computer system 100 is provisioned with real-time-capable host OS 120.

At block 303, CPUs 160-1 through 160-P are partitioned into a first subset having N CPUs dedicated to real-time tasks, where N is a positive integer less than P, and a second subset having P minus N CPUs dedicated to non-real-time tasks. In some embodiments block 303 is performed by hypervisor 125, while in some other embodiments block 303 is performed by host OS 120.

At block 304, a request for a virtual machine is received, where the request specifies a number K of virtual processors in the virtual machine for executing real-time tasks, and where K is a positive integer less than or equal to N. In one embodiment, the request is received by VM tool 140 from a user (e.g., a system administrator, a VM administrator, an application developer, etc.).

It should be noted that in some examples, if a number M of the N physical processors of the first subset are in use when the request is received (e.g., assigned to a virtual CPU of another virtual machine, etc.), where M is a positive integer less than N, method 300 may check that K is less than or equal to N−M before proceeding to execute the remainder of the method. In another implementation, method 300 may check that K is less than (N−M)−S, where S is the number of non-real-time virtual CPUs to be assigned to the VM. In yet another implementation, when (N−M)−K is greater than zero, min{S, (N−M)−K} of the S non-real-time virtual CPUs may be assigned to real-time physical CPUs, and when S>[(N−M)−K], the S−[(N−M)−K] remaining non-real-time virtual CPUs may be assigned to non-real-time physical CPUs.

In some examples, VM tool 140 may determine the number S of non-real-time virtual CPUs based on the requested number K of real-time virtual CPUs (e.g., S might be set to K/8, etc.). In some embodiments VM tool 140 may also determine a number H of additional host CPUs for handling tasks for the VM such as real-time network routing, and check that K is less than (N−M)−(S+H).

At block 305, VM 130 is created and instantiated with a real-time-capable guest OS 137. In one embodiment, block 204 is performed by hypervisor 125.

At block 306, one or more commands are submitted to one or both of hypervisor 125 and guest OS 137 to configure VM 130 so that is has K virtual CPUs 135 dedicated to real-time tasks and a set of zero or more additional virtual CPUs 135 dedicated to non-real-time tasks. In one embodiment, the one or more commands are submitted by VM tool 140.

At block 307, the command(s) to configure VM 130 are executed. In one implementation, one or both of hypervisor 125 and guest OS 137 are modified to execute the command(s).

At block 308, the virtual CPUs 135 are assigned to CPUs 160, such that each real-time virtual CPU is assigned to a respective real-time CPU 160, and each non-real-time virtual CPU is assigned to either a non-real-time CPU 160, or to a real-time CPU 160 if one is available (i.e., if there is a real-time CPU that does not have any real-time virtual CPU assigned to it). In some embodiments, block 308 may be performed by one or both of host OS 120 and hypervisor 125, while in some other embodiments block 308 may be performed by VM tool 140.

At block 309, an application that includes at least one real-time task, and possibly one or more non-real-time tasks, is deployed in VM 130. In some examples, the non-real-time tasks may include one or more non-real-time system tasks (e.g., a disk access, a non-real-time network routing function, etc.). It should be noted that in some examples, the real-time tasks may also include a system task that is real-time in nature (e.g., a real-time network routing function, a real-time system task that services VM 130, etc.) and that may be executed by host OS 120 or hypervisor 125. In some embodiments, the deploying may include binding each real-time task to a respective real-time virtual CPU 135.

Figure 4:
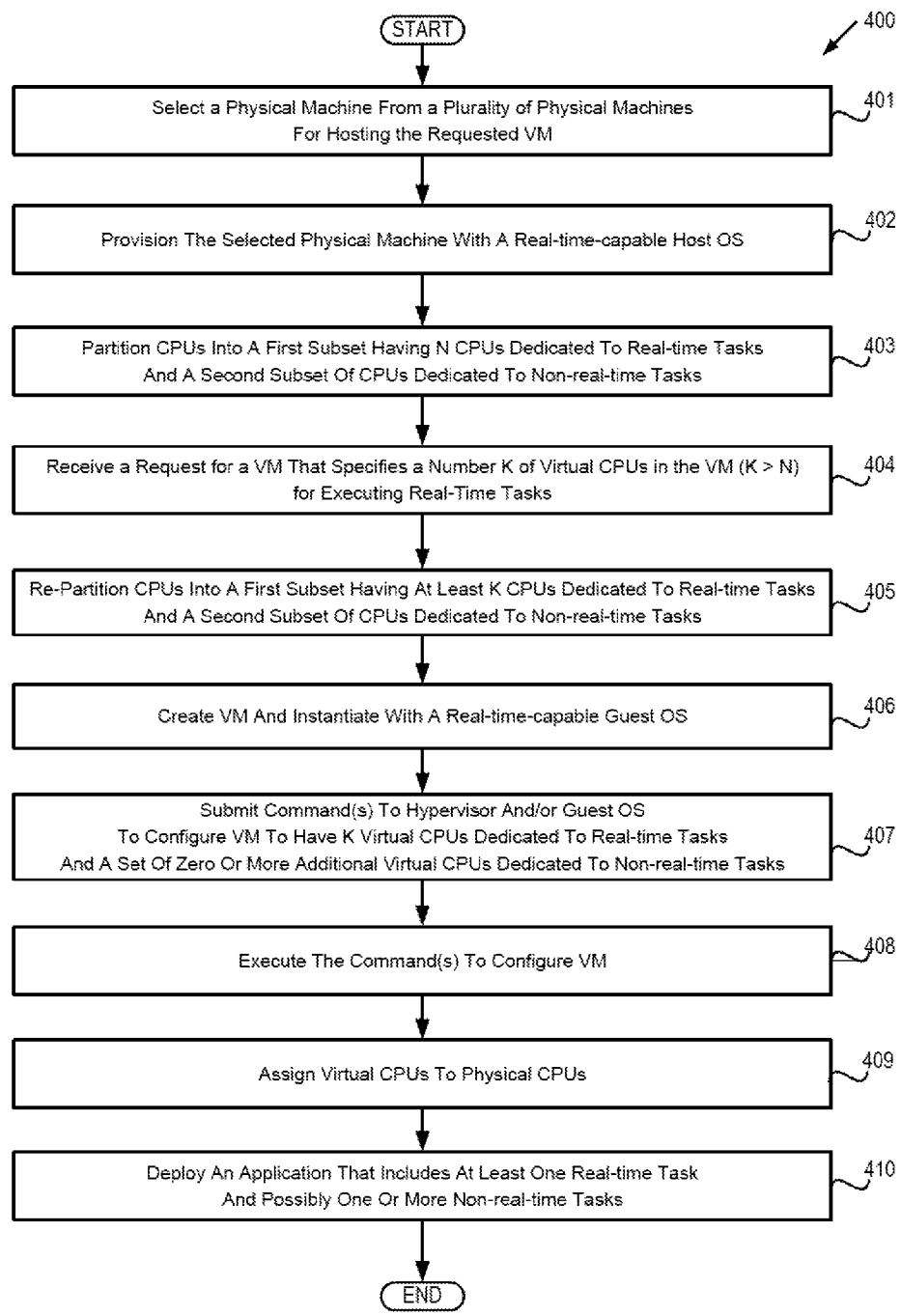
FIG. 4 depicts a flow diagram of one embodiment of a third method for configuring a virtualized system for real-time response from a virtual machine.

FIG. 4 depicts a flow diagram of one embodiment of a third method 400 for configuring a virtualized system for real-time response from a virtual machine. In this method, an existing partition of physical CPUs is modified in response to receiving a request for a VM that specifies a greater number of real-time virtual CPUs than can be accommodated by the existing partition.

The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1, while in some other embodiments, some or all of the method might be performed by another machine. It should be noted that in some embodiments blocks depicted in FIG. 3 may be performed simultaneously or in a different order than that depicted.

At block 401, a physical machine for hosting one or more VMs is selected from a plurality of physical machines (e.g., a cluster, a cloud-based server farm, etc.). In one example, block 401 is performed by VM tool 140, and computer system 100 is selected as the physical machine.

At block 402, the selected physical machine is provisioned with a real-time-capable host operating system. In one example, block 402 is performed by VM tool 140, and computer system 100 is provisioned with real-time-capable host OS 120.

At block 403, CPUs 160-1 through 160-P are partitioned into a first subset having N CPUs dedicated to real-time tasks, where N is a positive integer less than P, and a second subset having P minus N CPUs dedicated to non-real-time tasks. In some embodiments block 403 is performed by hypervisor 125, while in some other embodiments block 403 is performed by host OS 120.

At block 404, a request for a virtual machine is received, where the request specifies a number K of virtual processors in the virtual machine for executing real-time tasks, and where K is a positive integer greater than N. In one embodiment, the request is received by VM tool 140 from a user (e.g., a system administrator, a VM administrator, an application developer, etc.). As noted above, in some examples VM tool 140 might be hosted by a machine other than computer system 100.

At block 405, CPUs 160-1 through 160-P are re-partitioned into a first subset having at least K CPUs dedicated to real-time tasks, and a second subset having P minus K CPUs dedicated to non-real-time tasks. In some examples, the re-partitioning may reassign K minus N of the non-real-time CPUs to be real-time CPUs, while in some other examples the re-partitioning may be done "from scratch." In some embodiments block 405 is performed by hypervisor 125, while in some other embodiments block 405 is performed by host OS 120.

It should be noted that in some examples, if there are fewer than K real-time CPUs available for the re-partitioning (e.g., due to one or more real-time CPUs servicing one or more other virtual machines, etc.), an error message may be returned to the sender of the request (e.g., VM tool 140, etc.) indicating that the request cannot be serviced, and the execution of method 400 may be terminated.

At block 406, VM 130 is created and instantiated with a real-time-capable guest OS 137. In one embodiment, block 406 is performed by hypervisor 125.

At block 407, one or more commands are submitted to one or both of hypervisor 125 and guest OS 137 to configure VM 130 so that is has K virtual CPUs 135 dedicated to real-time tasks and a set of zero or more additional virtual CPUs 135 dedicated to non-real-time tasks. In one embodiment, the one or more commands are submitted by VM tool 140.

At block 408, the command(s) to configure VM 130 are executed. In one implementation, one or both of hypervisor 125 and guest OS 137 are modified to execute the command(s).

At block 409, the virtual CPUs 135 are assigned to CPUs 160, such that each real-time virtual CPU is assigned to a respective real-time CPU 160, and each non-real-time virtual CPU is assigned to either a non-real-time CPU 160, or to a real-time CPU 160 if one is available (i.e., if there is a real-time CPU that does not have any real-time virtual CPU assigned to it). In some embodiments, block 409 may be performed by one or both of host OS 120 and hypervisor 125, while in some other embodiments block 308 may be performed by VM tool 140.

At block 410, an application that includes at least one real-time task, and possibly one or more non-real-time tasks, is deployed in VM 130. In some examples, the non-real-time tasks may include one or more non-real-time system tasks (e.g., a disk access, a non-real-time network routing function, etc.). It should be noted that in some examples, the real-time tasks may also include a system task that is real-time in nature (e.g., a real-time network routing function, a real-time system task that services VM 130, etc.) and that may be executed by host OS 120 or hypervisor 125. In some embodiments, the deploying may include binding each real-time task to a respective real-time virtual CPU 135.

It should be noted that although the present disclosure is described in terms of real-time and non-real-time physical and virtual CPUs, in some other embodiments techniques of the present disclosure could be employed in virtualized systems in which there is a timing constraint associated with a first subset of physical CPUs and a first subset of virtual CPUs, and no timing constraint for a second subset of physical CPUs and a second subset of virtual CPUs. Similarly, techniques of the present disclosure could be employed in virtualized systems in which there is a first timing constraint associated with a first subset of physical CPUs and a first subset of virtual CPUs, and a second timing constraint associated with a second subset of physical CPUs and a second subset of virtual CPUs.

Figure 5:
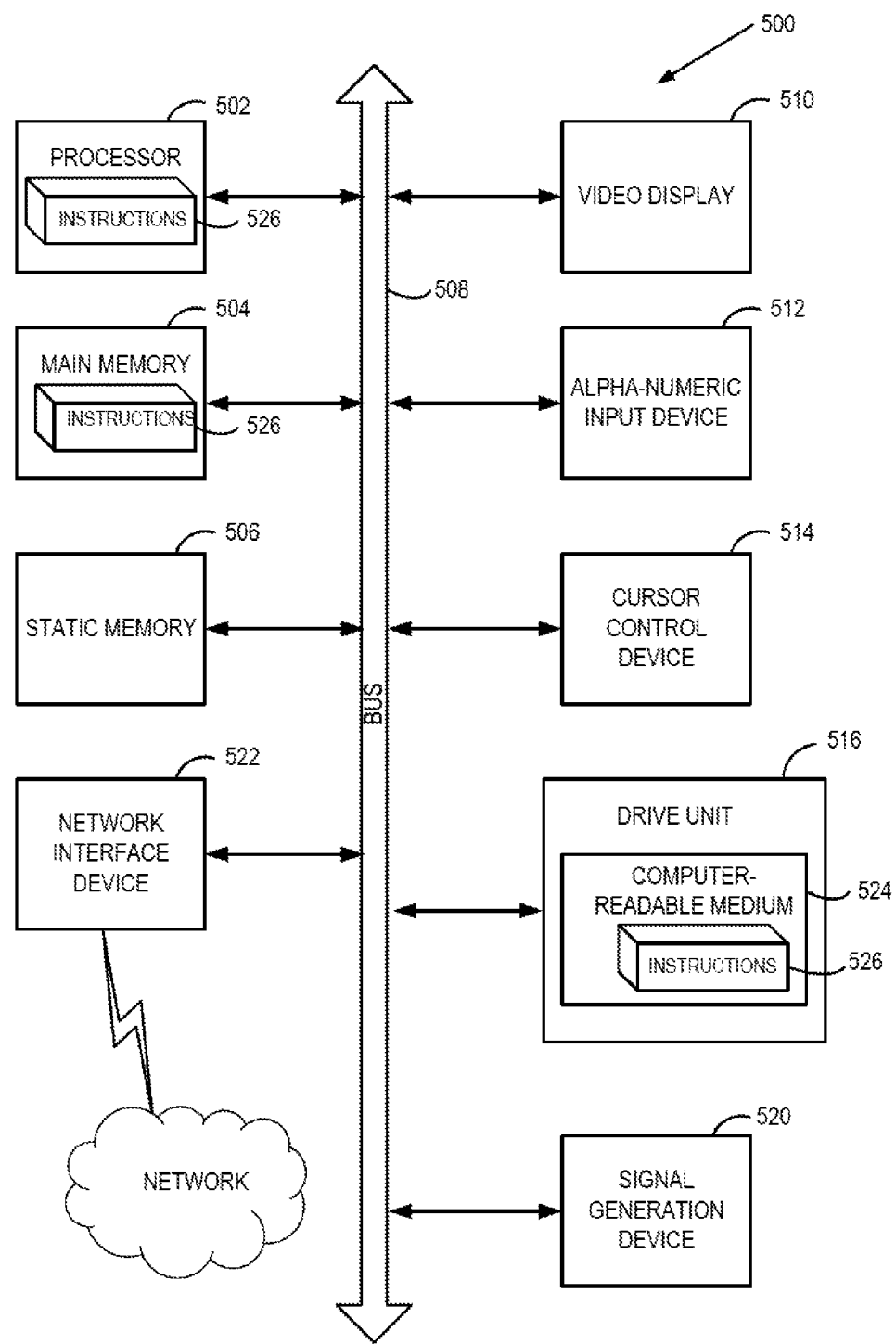
FIG. 5 depicts a block diagram of an illustrative computer system operating in accordance with embodiments of the disclosure.

FIG. 5 depicts an illustrative computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The illustrative computer system 500 includes a processing system (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 506.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable medium 524 on which is stored one or more sets of instructions 526 (e.g., instructions corresponding to the methods of FIGS. 2 through 4, etc.) embodying any one or more of the methodologies or functions described herein. Instructions 526 may also reside, completely or at least partially, within the main memory 504 and/or within the processor 502 during execution thereof by the computer system 500, the main memory 504 and the processor 502 also constituting computer-readable media. Instructions 526 may further be transmitted or received over a network via the network interface device 522.

While the computer-readable storage medium 524 is shown in an illustrative embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing description, numerous details have been set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "receiving", "partitioning", "submitting", "provisioning", "deploying", "assigning", "executing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. In addition, embodiments of the present disclosure are not described with reference to any particular programming language. It will be appreciated that a variety of programming languages may be used to implement the teachings of the disclosure as described herein.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. Embodiments of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method for configuring a virtualized system for real-time response from a virtual machine, comprising:
    partitioning, by a processing device, a plurality of physical processors into:
        a first set of physical processors dedicated to performing tasks each having a response time constraint, wherein the response time constraint indicates an amount of time within which at least one physical processor in the first set is to perform the associated task; and
        a second set of physical processors dedicated to performing tasks each lacking the response time constraint;
    receiving, by the processing device, a request to create a virtual machine, the request specifying a number of virtual processors for executing tasks having response time constraints; and
    in response to receiving the request:
        instantiating the virtual machine with a response time constraint capable operating system;
        submitting, by the processing device, a command to the operating system, wherein the command is to configure the virtual machine to comprise:
            a first set of virtual processors dedicated to executing tasks having the response time constraints, wherein each virtual processor of the first set of virtual processors is assigned to a respective physical processor of the first set of physical processor; and
            a second set of virtual processors dedicated to executing tasks lacking the response time constraints, wherein each virtual processor of the second set of virtual processors is assigned to a respective physical processor either in the first set of physical processors or the second set of physical processors, wherein the first set of virtual processors has at least the specified number of virtual processors, and wherein a virtual processor of the second set of virtual processors is assigned to a first physical processor of the first set of physical processors only when none of the virtual processors in the first set of virtual processors are assigned to the first physical processor; and
        deploying an application that includes one or more tasks having response time constraints and one or more tasks lacking response time constraint on the virtual machine.

2. The method of claim 1, wherein a tool executed by the processing device submits the command in response to the request, and wherein at least one of a hypervisor or a host operating system assigns virtual processors to physical processors.

3. The method of claim 1, wherein a tool executed by the processing device submits the command and assigns virtual processors to physical processors.

4. The method of claim 1, wherein the partitioning is performed by at least one of a hypervisor or a host operating system.

5. The method of claim 4, wherein at least one of the hypervisor or the operating system are capable of executing tasks having the response time constraints.

6. The method of claim 1, wherein the operating system is capable of executing tasks having the response time constraints.

7. An apparatus comprising:
    a memory; and
    a processing device, operatively coupled to the memory, to:
        partition a plurality of physical processors into:
            a first set of physical processors dedicated to performing tasks each having a response time constraint, wherein the response time constraint indicates an amount of time within which at least one physical processor in the first set is to perform the associated task; and
  a second set of physical processors dedicated to performing tasks each lacking the response time constraint, wherein the first set of physical processors has a first number of physical processors,
receive a request for a virtual machine, the request specifying a number of virtual processors for executing tasks having the response time constraints, wherein the specified number of virtual processors is less than or equal to the first number of physical processors;
instantiate the virtual machine with a response time constraint capable operating system; and
submit one or more commands to at least one of a hypervisor or the response time constraint capable operating system, wherein the one or more commands are to configure the virtual machine to comprise:
  a first set of virtual processors dedicated to executing tasks having the response time constraints, wherein each virtual processor of the first set of virtual processors is assigned to a respective physical processor of the first set of physical processor; and
  a second set of virtual processors dedicated to executing tasks lacking the response time constraints, and wherein the first set of virtual processors has at least the specified number of virtual processors, wherein each virtual processor of the second set of virtual processors is assigned to a respective physical processor either in the first set of physical processors or the second set of physical processors, and wherein a virtual processor of the second set of virtual processors is assigned to a first physical processor of the first set of physical processors only when none of the virtual processors in the first set of virtual processors are assigned to the first physical processor; and
deploy an application that includes one or more tasks having response time constraints and one or more tasks lacking response time constraints on the virtual machine.

8. The apparatus of claim 7, wherein a second number of physical processors of the first set of physical processors are in use when the request is received, and wherein the second number of physical processors is a positive integer less than the first number of physical processors, and wherein the processing device is further to determine, prior to submitting the one or more commands, that a size of the first set of virtual processors is less than or equal to a difference of the first number of physical processors and the second number of physical processors.

9. The apparatus of claim 7, wherein a first task that lacks the response constraint and is executed by the virtual machine is a system task.

10. The apparatus of claim 9, wherein the system task comprises at least one of network routing or disk access.

11. The apparatus of claim 7, wherein a first task that lacks the response constraint is executed by the hypervisor or a host operating system, and wherein a second task having the response constraint is a system task that services the virtual machine.

12. The apparatus of claim 7, wherein the one or more commands are further to create the virtual machine in response to the request.

13. The apparatus of claim 7, wherein at least one of the hypervisor or the response time constraint capable operating system are modified to execute the one or more commands.

14. A non-transitory computer-readable medium having instructions stored therein which, when executed by a processing device, cause the processing device to:
partition a plurality of physical processors into:
  a first set of physical processors dedicated to performing tasks each having a response time constraint, wherein the response time constraint indicates an amount of time within which at least one physical processor in the first set is to perform the associated task; and
  a second set of physical processors dedicated to tasks each lacking the response time constraint, wherein the first set of physical processors has a first number of physical processors,
receive, after the partitioning, a request for a virtual machine, the request specifying a number of virtual processors for executing tasks having the response time constraint, wherein the specified number of virtual processors is greater than the first number of physical processors; and
in response to the request:
  re-partition, by the processing device, the plurality of physical processors into a new first set of physical processors dedicated to executing tasks having the response time constraints, and a new second set of physical processors dedicated to executing tasks lacking the response time constraints, wherein the new first set of physical processors has at least as many physical processors as the specified number of virtual processors for executing tasks having the response time constraints;
  instantiate the virtual machine with a response time constraint capable operating system;
  submit, by the processing device, one or more commands to at least one of a hypervisor or the response time constraint capable operating system of the virtual machine, wherein the one or more commands are to:
    configure the virtual machine to have a first set of virtual processors dedicated to executing tasks having the response time constraints, wherein each virtual processor of the first set of virtual processors is assigned to a respective physical processor of the first set of physical processor;
    configure the virtual machine to have a second set of virtual processors dedicated to executing tasks lacking the response time constraints, wherein each virtual processor of the second set of virtual processors is assigned to a respective physical processor either in the first set of physical processors or the second set of physical processors, and wherein the first set of virtual processors has at least the specified number of virtual processors, and wherein a virtual processor of the second set of virtual processors is assigned to a first physical processor of the first set of physical processors only when none of the virtual processors in the first set of virtual processors are assigned to the first physical processor; and
  deploy an application that includes one or more having response time constraints and one or more tasks lacking response time constraints on the virtual machine.

15. The non-transitory computer-readable medium of claim 14, wherein the instructions further cause the processing device to select a physical machine from a plurality of physical machines to host the virtual machine.

16. The non-transitory computer-readable medium of claim 15, wherein the instructions further cause the processing device to
provision the selected physical machine with a host operating system capable of executing tasks having the response time constraints.

17. The non-transitory computer-readable medium of claim 16, wherein to deploy the application, the processing device binds the one or more tasks having the response time constraints to a virtual processor of the first set of virtual processors.

18. The non-transitory computer-readable medium of claim 14, wherein a tool executed by the processing device submits the one or more commands in response to the request, and wherein at least one of the hypervisor or a host operating system assigns virtual processors to physical processors.

19. The non-transitory computer-readable medium of claim 14, wherein a tool executed by the processing device submits the one or more commands and assigns virtual processors to physical processors.

\* \* \* \* \*